March 3, 1964 — L. JULIE — 3,123,765
COMPACT RESISTOR-CAPACITOR UNIT
Filed Feb. 25, 1960 — 2 Sheets-Sheet 1
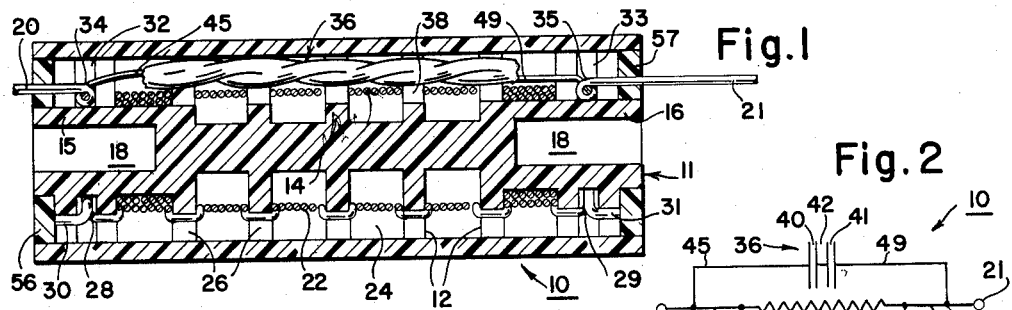
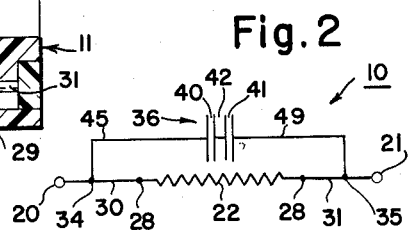
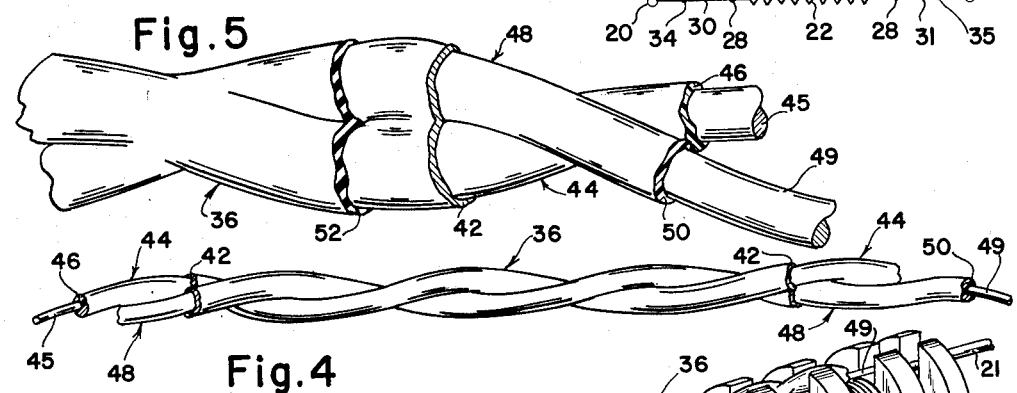
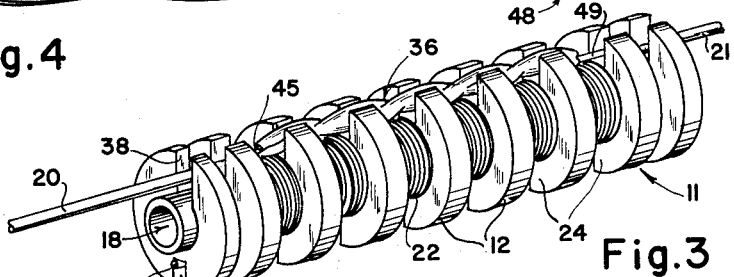
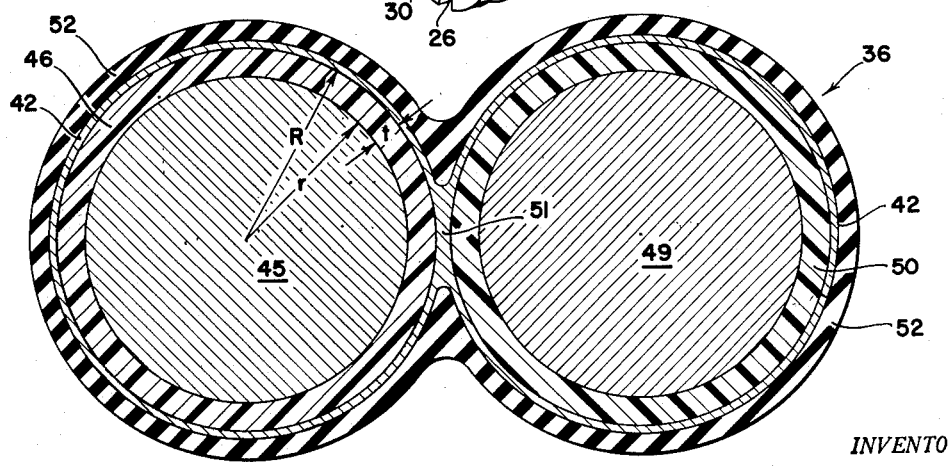
INVENTOR.
Loebe Julie
BY
Curtis, Morris, & Safford
ATTORNEYS March 3, 1964 L. JULIE 3,123,765
COMPACT RESISTOR-CAPACITOR UNIT
Filed Feb. 25, 1960 2 Sheets-Sheet 2

INVENTOR.
Loebe Julie
BY
Curtis, Morris, & Safford
ATTORNEYS

United States Patent Office 3,123,765
Patented Mar. 3, 1964

3,123,765
COMPACT RESISTOR-CAPACITOR UNIT
Loebe Julie, New York, N.Y., assignor to Julie Research Laboratories, Inc., New York, N.Y.
Filed Feb. 25, 1960, Ser. No. 10,900
13 Claims. (Cl. 323—74)

The present invention relates to capacitor construction methods and apparatus and compact resistor-capacitor units fabricated thereby. More particularly the present invention relates to capacitor construction methods wherein an intermediate or "floating" electrode is interposed between the main electrodes and is insulated from both of the main electrodes by the dielectric material of the capacitor. The effective capacitance provided by capacitor units embodying this invention is the capacitance from one of the main electrodes to the intermediate electrode in series with the capacitance from the intermediate electrode to the other main electrode. R-C components embodying this invention are reliable in operation and can be fabricated with ease and precision to various predetermined values of resistance and capacitance.

It is an object of this invention to provide capacitor fabrication processes and compact resistor-capacitor units made thereby which are convenient and reliable and wherein the articles made have a high capacitance per unit volume. The compact resistance-and-capacitance circuit components which are described as examples of this invention are particularly well suited for use in electronic equipment, computers, data processing machines, electrical measurement and control apparatus, and so forth.

Among the many advantages provided by the illustrative examples of this invention described herein are those resulting from the fact that they enable the construction of capacitor units having a thin layer electrode initially applied in fluid form while avoiding any requirement for making a direct electrical connection to this thin layer electrode. As a result of applying this thin electrode initially in fluid form, the electrode adheres tightly to the adjacent dielectric layer and prevents air pockets. Thus, the capacitance is increased because of the close conformance of this fluid-applied electrode to the dielectric, and the voltage breakdown strength is increased because ionizable gas pockets are avoided.

In the examples of the invention as described this fluid-applied electrode is made by the application of a conductive paint which then dries to form an intermediate "floating" electrode interposed between the two main electrodes. There is no direct electrical connection with this intermediate floating electrode; instead it is in closely spaced capacitive relationship with both of the main electrodes. The resulting capacitor is small in volume while providing a high capacitance per unit volume.

Another advantage of the process of the present invention is that it enables a thin dielectric layer to be used while providing double the voltage-breakdown-strength of the dielectric layer. The dielectric strength of the insulation layer between each main electrode and the intermediate "floating" electrode is in series additive relationship so as to provide double the voltage-breakdown strength of either layer. Thus, also, the reliability of the capacitor unit is increased. In the event that a pin-hole should develop in one of the dieletcric layers, a short-circuit failure is prevented by virtue of the presence of the other dielectric layer which remains operative.

A further advantage of the present invention is that it facilitates the fabrication of small capacitor units having precisely predetermined capacitance values. By the application or removal of small areas of the intermediate electrode, the capacitance value is proportionately changed in a convenient and easy manner to produce a component having the desired value.

In this specification and in the accompanying drawings are described and shown fabrication methods and capacitor units embodying my invention and various modifications thereof are indicated, but it is to be understood that these are not intended to be exhaustive nor limiting of the invention, but on the contrary are given for purposes of illustration in order that others skilled in the art may fully understand the invention and the manner of applying the method and apparatus in practical use so that they may modify and adapt it in various forms, each as may be best suited to the conditions of a particular use.

The various objects, aspects, and advantages of the present invention will be more fully understood from a consideration of the following specification in conjunction with the accompanying drawings, in which:

FIGURE 1 is an axial sectional view of a resistance-and-capacitance component embodying the present invention and comprising a resistor shunted by two capacitors in series;

FIGURE 2 is a schematic circuit diagram of the R-C component shown in FIGURE 1;

FIGURE 3 is a perspective view of the R-C component of FIGURES 1 and 2, with the cylindrical cover and encapsulation material removed so as to reveal further details of construction;

FIGURE 4 is an illustration, on enlarged scale, of the compact capacitor unit which is incorporated into the R-C component of FIGURES 1, 2, and 3 and which comprises two capacitors in series;

FIGURE 5 is a perspective view, on a further enlarged scale, of a portion of the capacitor unit of FIGURE 4 with parts broken away to show the internal construction;

FIGURE 6 is a cross-sectional view, on a greatly enlarged scale, of the capacitor unit shown in FIGURES 4 and 5.

Figure 7:
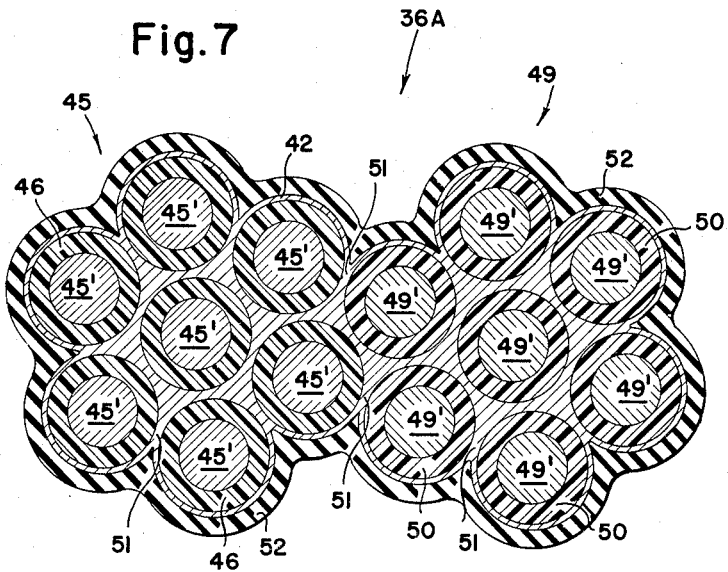
FIGURES 7 and 8 are partial cross sectional views of two modified forms of capacitor unit embodying the present invention.

The resistance and capacitance component 10 which is illustrated in FIGURES 1, 2, and 3, as an embodiment of the invention includes a resistor shunted by two compact capacitors in series and effectively providing a predetermined desired amount of capacitance shunted across the resistor. The resistor itself is a precision wire-wound resistor, and the capacitance value can be adjusted during fabrication to provide a predetermined value. Nevertheless, the capacitor unit which is incorporated into the R-C component is constructed and installed therein so that the over-all size of the R-C component is no larger than that for a typical prior wire-wound resistor of the same rating, and is reliable in operation. Accordingly, this R-C component is well suited for use in a wide variety of electronic systems and equipment where compact size, precision, and reliability are important.

This R-C component includes a spool or bobbin 11 of electrically insulating material having a plurality of flanges 12 integrally formed on an axial core 14. At its opposite ends the core has enlarged end parts 15 and 16 with axial sockets 18 therein for use in mounting the component. Extending from opposite ends of the component are a pair of stiffly flexible wire leads 20 and 21 forming terminals for the component. The component 10 is quite light in weight, and the leads 20 and 21 are sufficiently stiff that they can serve as mounting supports for the component. For example, these terminal leads are electrical brass or copper wires having a diameter in the range from 0.016 of an inch to 0.048 of an inch with a tin coating on them to aid in making solder connections thereto.

The resistance element 22 in circuit between these terminals 20 and 21 is illustrated in the form of a resistance wire which is wound on the bobbin 11 in the annular winding channels 24 between the respective flanges 12. Approximately equal portions of the resistance wire 22 are wound in each of the four inner winding channels, and a smaller portion of the wire is wound in each of the pair of outer shallow winding channels surrounding the enlarged parts 15 and 16 of the bobbin core.

In order to reduce the effective inductance of the resistance winding, the directions of winding of the resistance wire lying in adjacent winding channels are reversed. The resistance wire extends through slots 26 in the intervening flanges as it passes from one winding channel to the next. These slots 26 are axially aligned and are all of the same depth. They extend inwardly toward the core 14 a depth of approximately one-third of the depth of the deeper central flanges.

The opposite ends of the resistance wire 22 are securely connected at the points 28 and 29 to a pair of stiff terminal connections formed by loops of thicker resistance wire 30 and 31 lying in the narrow end grooves 32 and 33 of the bobbin, and each having an end bent outwardly and fitting into the slot 26 of the end flange. These connection elements 30 and 31 are soldered to the inner ends of the terminal leads 20 and 21 which are twisted around them, as shown at 34 and 35, respectively.

To accommodate the terminal leads and also a capacitor unit 36, as will be described, the flanges of the bobbin have axially aligned slots 38 therein diametrically opposite the slots 26. These slots 38 have a depth of approximately two-thirds of the depth of the central flanges, and the bottom of these slots 38 in the outer flanges is flush with the surface of the enlarged core part 15 or 16.

The capacitor unit 36 comprises two capacitors 40 and 41 in series and having a common intermediate electrode 42 which is insulated from the remainder of the circuit by the respective dielectric layers of the capacitors 40 and 41. This intermediate electrode is initially applied as a fluid to the dielectric layers and thus forms a thin film electrode which closely conforms to the surface of the dielectric and prevents any gas pockets from occurring in the region between the electrodes. Thus, the problems of ionization occurring within the capacitor are avoided, and a resultant increased capacitance, reliability, and voltage-breakdown-strength are provided.

In this illustrative embodiment of the invention, the compact capacitor unit 36 as seen in greater detail in FIGURES 4, 5, and 6, comprises a first length of insulated electric wire 44 having a conductor 45 and a thin sheath 46 of insulation surrounding the conductor. A second length of insulated electric wire 48 is fastened in position closely adjacent to this first wire and includes a conductor 49 and a thin sheath 50 of insulation surrounding the conductor 49. As illustrated most clearly in FIGURES 4 and 5, a convenient way in which these two insulated wires are fastened together in closely adjacent relationship is to twist them longitudinally about each other into a spiral lay. It will be understood that in FIGURES 4 and 5 the relative thickness of each insulation sheath 46 and 50 has been exaggerated for clarity of illustration and that representative dimensional relationships of these parts of the capacitor unit are described further below in detail in the various examples set forth.

In this compact capacitor unit 36, the conductor 45 advantageously provides one of the main electrodes and also one of the terminals of the capacitor unit. Similarly, the conductor 49 provides the other main electrode and also the other terminal of the capacitor unit. To form one terminal, as shown in FIGURE 4, a short portion of the insulated wire 44 extends beyond the end of the other wire 48, and its conductor 45 is scraped free of insulation; in corresponding fashion, the other terminal at the other end of the capacitor unit is formed by a short extending portion of the wire 48 having its conductor 49 bared of insulation.

When the capacitor unit is incorporated into the component 10, it extends in an axial direction thereof through the aligned slots 38 in a position near to but outside of the resistance winding itself. The conductor electrodes 45 and 49 are suitably secured to the respective terminal leads 20 and 21 as by soldering at the junction points 34 and 35.

Although this particular example shows the bared ends of the conductors 45 and 49 at opposite ends of the capacitor unit 36, it will be appreciated that this invention enables a wide variety of configurations to be used. For example, both of these bared ends may be located at the same end of the capacitor unit 36. Also, it will be understood that the capacitor unit itself may be coiled up or twisted into a multitude of configurations as may be desirable for incorporation into different types of electronic equipment. The conductor electrodes 45 and 49 may be very fine, flexible wires and each insulation sheath is thin; so that a high degree of flexibility may be provided for shaping or coiling the capacitor unit into various convenient shapes without causing deterioration of its electrical performance. Regardless of the particular configuration used, a capacitor unit which embodies this invention has a high capacitance per unit volume and per unit weight.

Surrounding both of the insulation sheaths 46 and 50 is the intermediate electrode 42 which is common to both of the capacitors 40 and 41 and is provided by a thin layer of conductive material. This intermediate electrode 42 is applied in fluid form to the exterior surface of these two insulation sheaths, as illustrated in FIGURE 4, and it has a figure-eight configuration, as seen most clearly in FIGURE 6. An outer insulation covering 52 is then applied over the intermediate electrode 42 and preferably completely covers all areas of this electrode 42. FIGURE 4 illustrates the capacitor unit 36 before the outer insulation covering has been applied, and in FIGURE 5, portions of this covering are shown cut away. It is found preferable to have this outer insulation covering extend for the full length of the capacitor unit, except for the bared terminal ends of the conductors 45 and 49, for this covering provides additional mechanical support for the electrode 42.

In accordance with the invention single-strand insulated conductors can be used to form either or both of the main conductor electrodes 45 and 49, or multiple-strand conductors wherein each strand is insulated from the other strands, as in litz wire, can be used. As illustrated in FIGURES 4, 5, and 6, the capacitor unit 36 is formed by two lengths of insulated single-strand conductors. In FIGURE 7 the capacitor unit 36A is formed by using two litz wires and has the advantage of providing even higher capacitance values per unit volume.

The capacitor unit of FIGURE 7 is generally similar to the one described in detail in connection with FIGURES 4, 5, and 6, and parts performing corresponding functions have corresponding reference numbers. The two conductor electrodes 45 and 49 each comprise a seven-strand litz wire, including individual conductive strands 45' and 49', respectively. A thin sheath of insulation 46 surrounds each of the strands 45' and a similar sheath of insulation 50 surrounds each of the strands 49'.

To form the terminal end for the conductor electrode 45, the end portion of each of the seven strands 45' is bared of insulation and is suitably conductively joined together with its companion strands as by twisting them together and soldering. Similarly, the terminal end for the other conductor electrode 49 is formed by conductively interconnecting the seven companion strands 49' of the other litz wire. Thus, the seven individual strands of each conductor effectively provide seven companion electrodes coacting in parallel to increase the total capacitance. By virtue of the fact that the total surface area adjacent to the dielectric layers 46 and 50 of the multiple companion fine strands of the respective electrodes in FIGURE 7 is greater than the surface area of the single conductor electrode of FIGURE 6, the capacitor unit shown in FIGURE 7 provides a further increase in capacitance per unit volume.

The common intermediate electrode 42 is initially applied as a liquid, and capillary attraction draws the layer 42 in and about each of the strands before the layer 42 dries and hardens in place. An outer insulation covering 52 is then applied to cover the intermediate electrode 42 and protect it. This outer insulation covering is preferably applied as a liquid and then allowed to solidify in position.

Figure 8:
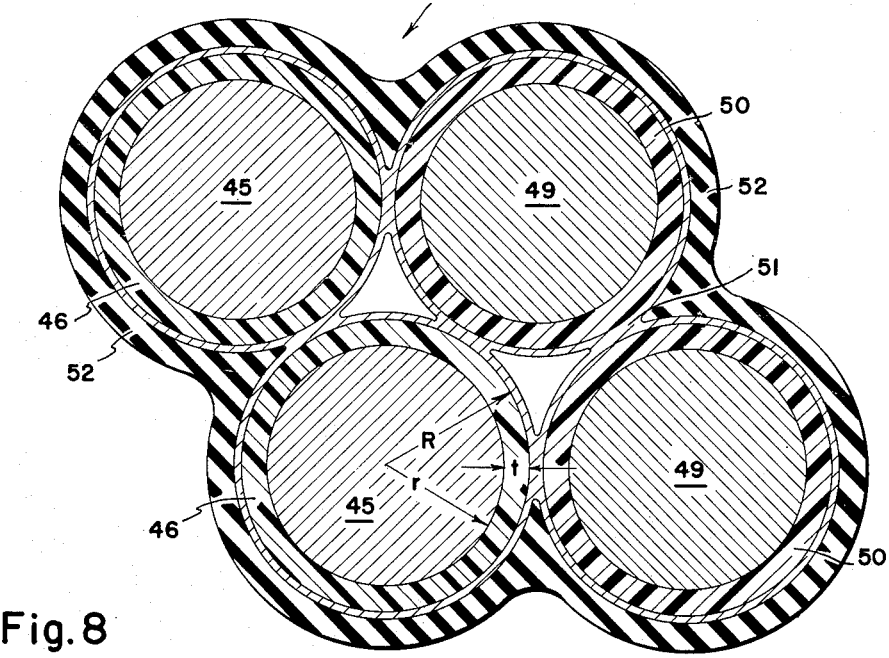

As shown in FIGURE 8, instead of using litz wire, a plurality of single-strand insulated conductors 45' and 49' can be grouped together to form the respective main electrodes 45 and 49 of the capacitor unit 36B.

The capacitor unit 36, 36A or 36B is positioned in the slots 38 of the bobbin and suitably connected to the terminal leads 20 and 21 as by soldering at the points 34 and 35.

In order to complete the R-C component, it is suitably encased to protect it from humidity, for example, an outer insulation sleeve 54 of rigid insulation material similar to the rigid material of the bobbin 11 is slid axially over the assembly until the ends of this sleeve are aligned with the ends of the bobbin. As a final step, the ends of this sleeve are suitably sealed up by plugs 56 and 57 of encapsulating material therein. Suitable bobbins and sleeves of epoxy resin material are obtainable from Norrich Plastics Corporation, of New York, New York, and the encapsulating material used in this embodiment is also epoxy resin obtainable in liquid form as an encapsulant from Houghton Laboratories, of Olean, New York.

Suitable resistance wire material for the resistance element 22 is, for example, Evenohm enamel-coated resistance wire, which is obtainable commercially from Wilbur B. Driver Co., of Newark, New Jersey, and Karma enamel-coated resistance wire, from Driver-Harris Co., of Harrison, New Jersey. Suitable resistance wires, such as these, have a composition approximately of 75% nickel, 20% chromium, 2.5% aluminum and 2.5% copper. Other suitable resistance wires obtainable from Wilbur B. Driver Co. are: Tophet "A" having a composition approximately of 80% nickel and 20% chromium; and Tophet "C" having approximately a composition of 60% nickel, 15% chromium and 25% iron. Another very suitable resistance wire is sold by Driver-Harris Co. under the name Nichrome and has a composition of approximately 60% nickel, 15% chromium and 25% iron.

For resistors having a resistance value below 10,000 ohms, it is usually preferable to utilize a resistance wire element 22 having a diameter of at least .004 of an inch. In the range between 10,000 ohms and 100,000 ohms, a diameter of .002 of an inch is preferable; and above 100,000 ohms, .001 of an inch is preferable.

CAPACITOR CONSTRUCTION METHODS

Process I

In one process which has proven itself to be advantageous for constructing the capacitor unit 36, the insulated wires 44 and 48 have conductors 45 and 49, which are shown in FIGURE 6 as single-strand conductors, in FIGURE 7 as litz wire, and in FIGURE 8 as a plurality of individual single-strand conductors. These conductors are insulated with thin sheaths of impervious insulation material, for example, such as enamel, varnish, Teflon, ceramic, or glass. Suitable insulated electric wires are available commercially, for example, as enamel-coated copper wire, for example, as made by Belden Manufacturing Company, of Chicago, Illinois, and by Alpha Wire Corporation, of New York, New York.

The conductors 45 and 49 are secured in side-by-side relationship, as by twisting them together. A thin layer 42 of a conductive liquid, such as a colloidal dispersion of conductive particles in a liquid vehicle, is applied to the exterior surface of each insulation sheath and is then dried to form a common intermediate electrode of the capacitor unit. By capillary attraction the conductive liquid is drawn in between the conductors to provide a good electrical connection by merging and bonding at the junction 51 between the respective cylindrical portions of the common electrode layer 42.

For purposes of forming this thin conductive layer 42, it is found that any one of various conductive liquid coatings can be used, for example, a silver paint No. 560 which is available commercially from Handy and Harmon of New York, New York, or a colloidal dispersion of pure electric-furnace graphite in water which is available under the trademark "Aquadag" from the Acheson Colloids Company, of Port Huron, Michigan. The silver paint is preferred because it provides a higher conductivity per unit of thickness.

In order to prevent any short-circuit between the intermediate electrode 42 and either of the conductor electrodes 45 or 49, it is preferable to cease applying the layer 42 a short space, such as ⅛ or ¼ of an inch, from the respective ends of the insulation sheaths 46 and 50. However, the actual length of the electrode 42 which is used is determined by the desired capacitance value for the unit 36. By applying a slightly increased area of the conductive paint, or by removing a small region thereof, the capacitance is conveniently adjusted to a desired value during production.

As shown in FIGURE 4, a convenient way to assure a good electrical and mechanical union between all parts of the common electrode layer 42 is to twist the two wires together at least two complete turns along their length.

The common electrode layer 42 has a figure-eight configuration as seen in cross section in FIGURE 6. In FIGURES 7 and 8, the common electrode is seen to have a plurality of cylindrical portions, one-half of which individually surround the conductive electrode elements forming one of the main electrodes, and the other half of the cylindrical portions of the common electrode individually surround the conductive electrode elements of the other main electrode.

After this common electrode is completed, then the final insulation covering is applied. A highly satisfactory way to form this outer insulation covering is to apply a rubber-type paint, for example, it is found advantageous to use a neoprene paint obtainable under the trademark "Apco" from the Adhesives Products Corp., of New York, New York. It will be noted in FIGURE 6 that this outer insulation covering also has a figure-eight configuration as seen in cross section and serves to aid in protecting the thin conductive electrode 42 and also in bonding the two wires together. Then the capacitor unit is positioned in the slots 38 and the terminals thereof are secured at the points 34 and 35.

As illustrated in FIGURES 6, 7, and 8, the capacitor unit made by this process has a thin layer electrode 42 which closely conforms at all points to the thin insulation sheath surrounding the respective conductor electrodes 45 and 49. This process eliminates any pockets of air and thus avoids the problems of ionization of gas within the capacitor. Moreover, by virtue of the substantially uniform thinness of the dielectric layers 46 and 50 and the close conformity of the intermediate electrode thereto, a relatively great capacitance per unit size of the capacitor unit is provided.

Any requirement for making direct connection to the conductive paint layer forming this intermediate electrode is avoided, for it is in capacitive relationship with both of the main electrodes, as indicated schematically in FIGURE 2. The effective capacitance "C" of the whole unit is a result of these two capacitors 40 and 41 in series, and is determined from the formula:

$$(1) \quad \frac{1}{C} = \frac{1}{c_1} + \frac{1}{c_2}$$

where $c_1$ and $c_2$ are the capacitance values of the two capacitors 40 and 41.

In view of the fact that these two capacitors 40 and 41 are made substantially identical, their capacitance values are substantially equal, and accordingly this formula reduces to:

(2) $$C = \frac{c}{2}$$

where "c" is the capacitance of either of the capacitors 40 or 41.

It will be appreciated that the total voltage-breakdown-strength of the capacitor unit is the sum of the strengths of the individual dielectric layers 46 and 50.

Various examples of capacitor units made in accordance with the present invention are described further below.

Process II

A second process for constructing the capacitor unit 36, is similar to that described above, except that the two insulated wires are twisted together after the conductive paint layer 42 has been applied to each but before it has dried. This process also provides an intimate bonding at the junction 51 of the common electrode because the conductive fluid layers actually flow together and merge before complete drying thereof occurs. After complete drying of the layer 42 has occurred, then the outer insulation covering is applied and the remaining steps are carried out as in the first example.

Process III

In a third process for constructing the capacitor unit 36, the insulated wires forming the respective main electrodes are coated with the thin conductive layer 42 before the respective main electrodes are brought together, and this layer 42 is allowed to dry. Then, the two insulated wires are secured into side-by-side relationship, as by twisting. If desired, for strengthening the junction 51, additional conductive liquid is applied in this region after assembly and is solidified in place.

CALCULATIONS

In order to calculate the effective capacitance of the capacitor unit 36, the capacitance $c$ of one of the capacitors is calculated and divided by 2 in accordance with Formula 2 above. Strictly speaking, the inner and outer electrodes of the individual capacitors have concentric cylindrical surfaces and thus the capacitance formula for concentric cylinders applies. However, that formula involves the ratio of $R/r$ which is very nearly a unitary ratio in these examples, for the sheaths 46 and 50 of dielectric are quite thin. Thus, the formula for concentric cylinders is not convenient to use. Accordingly, it is noted that the ratio of the radii R or r to the thickness "t" of the dielectric layer is so large that the formula for a parallel plate capacitor properly applies:

(3) $$c = 0.2244 K \frac{A}{t} \text{ micromicrofarads}$$

where A is the surface area in square inches of the electrode 45, $t$ is the thickness in inches and K is the dielectric constant for the insulation sheath 46.

In terms of the radius and length L of the electrode 42, this formula becomes:

(4) $$c = 1.41 \frac{KrL}{t} \text{ micromicrofarads}$$

The over-all length of the component 10 as shown in FIGURE 1 is 1 9/16 inches, with an axial distance of 15/16 of an inch between the connection points 34 and 35. It is found that the maximum convenient length for the conductive paint layer 42 is 3/4 inch. By using various diameters of wires and areas of the electrode 42, a large range of capacitance values can be readily fabricated as may be desired.

EXAMPLE I

Using a No. 30 copper enamel-coated magnet wire, which has a radius of 0.005 of an inch, an insulation thickness $t$ of 0.0002 of an inch and dielectric constant of approximately 3 and an electrode layer 42 which has a length L of 0.75 of an inch, the capacitance of each capacitor 40 and 41 is calculated to be 80 micromicrofarads. The over-all capacitance C of the unit 36 is one-half of this, or 40 micromicrofarads.

By reducing the length L, the capacitance is proportionately reduced to any desired value in the range from 40 to 5 micromicrofarads.

EXAMPLE II

The slots 38 are widened slightly from that shown, and two pairs of No. 32 enamel-coated copper magnet wire are used in parallel. The radius of the wire is 0.004 of an inch and the dielectric is the same as before, with a length L for the floating electrode of 0.75 of an inch. The capacitance of each capacitor is 65 micromicrofarads, and since there are two pairs in parallel, the over-all effective capacitance C is this same value.

This construction of two pairs of wires is shown in FIGURE 8. By reducing the length L, and by removing one of the pairs of capacitors, the capacitance is proportionately reduced to any desired value in the range from 65 to 4 micromicrofarads.

EXAMPLE III

In FIGURE 7 is shown a capacitor unit 36A comprising two litz wires each including seven strands of No. 44 insulated wire. Each individual strand has a diameter of 0.002 of an inch, which is one-fifth that of the wire in FIGURE 6. With an insulation thickness $t$ equal to or slightly less than that in FIGURE 6, then the capacitance contributed by each strand and the associated cylindrical portion of the common intermediate electrode 42 is approximately one-fifth that in FIGURE 6. Accordingly, the total capacitance of the capacitor unit 36A is approximately seven-fifths that of the unit 36; however, this unit 36A advantageously occupies a further reduced volume. By providing a longer or shorter length of the common intermediate electrode 42, then the capacitance can be adjusted to the desired value. By varying the common intermediate electrode 42 from a length of 0.75 of an inch to a length of 0.07 of an inch, then the capacitance is adjusted from approximately 60 to 5 micromicrofarads.

It is noted that in certain instances the common intermediate electrode 42 does not completely encircle each insulated conductor at every position along the length thereof. For example, the insulation sheaths of adjacent conductors may become tightly pressed together at one or more points along their length prior to the application of the conductive liquid material. This pressure occurs from the twisting or binding of the wires prior to the coating thereof. The capillary attraction advantageously draws the conductive liquid laterally and longitudinally into the crevices and spaces between wires so that the conductive layer has cylindrical portions substantially surrounding each and every conductor, thus creating a large electrode area for providing a large capacitance. However, the conductive liquid may be excluded at the points where there is tight pressure between adjacent wires. The liquid flows longitudinally of the wires into many spaces wherein direct lateral access may be blocked. As used herein, the term "cylindrical" is intended to include a surface of cylindrical form enclosing an insulated conductor as well as a surface of cylindrical form which partially surrounds an insulated conductor.

The basis for the Formula 3 above appears in Radio Engineer's Handbook, by F. E. Terman (first ed., 1943), at page 112.

From the foregoing it will be understood that the capacitance construction methods and apparatus and components embodying the present invention as described above are well suited to provide the advantages set forth, and since many possible embodiments may be made of the various features of this invention and as the methods and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. An R-C component for use in electrical and electronic systems and equipment comprising a resistor shunted by a capacitance unit, said resistor including a pair of terminals and resistance material connected between said terminals, said capacitance unit comprising a first wire connected to one of said terminals and having a thin sheath of insulation therearound, a second wire connected to the other of said terminals and having a second thin sheath of insulation therearound, said first and second wires having portions thereof extending in side-by-side relationship, a thin layer of fluid-applied electrically-conductive material surrounding and adhering to the exterior surfaces of both of said insulation sheaths, said thin layer forming a figure-eight pattern as seen in cross section, and an outer cover of insulation surrounding said conductive layer and also having a figure-eight configuration as seen in cross section.

2. An R-C component adapted for use in electrical and electronic equipment and systems comprising a resistor shunted by a pair of capacitors in series, said resistor including a pair of terminals and resistance material connected between said terminals, said pair of capacitors in series comprising a first wire connected to one of said terminals and having a thin sheath of insulation therearound, a second wire connected to the other of said terminals and having a second thin sheath of insulation therearound, said first and second wires having portions thereof extending in closely adjacent side-by-side relationship with said first and second insulation sheaths touching at a plurality of points along the lengths of said wires, a thin layer of a liquid-applied electrically-conductive material surrounding and adhering to both of said insulation sheaths and forming a figure-eight pattern as seen in cross section, and an outer cover of insulation surrounding said thin layer of conductive material and also having a figure-eight configuration as seen in cross section.

3. An R-C component as claimed in claim 2 and wherein the capacitance between each of said wires and said thin layer of electrically-conductive material is approximately equal and the effective capacitance between said first and second wires is approximately one-half of that between either wire and said thin layer.

4. An electrical capacitance unit including a plurality of electrical conductors in closely adjacent relationship, at least one of said conductors comprising one main electrode of the capacitance unit and at least one other of said conductors comprising another main electrode of the capacitance unit, each of said electrical conductors having a thin sheath of electrical insulation thereon, a layer of electrically conductive material having cylindrical portions adhering to the insulation sheath of each conductor, said layer comprising a solidified liquid-applied coating, the respective cylindrical portions of said layer of electrically conductive material being conductively interconnected for providing a common intermediate electrode of said capacitance unit, said thin sheaths of electrical insulation thereby being the dielectric material in said capacitance unit.

5. An electrical capacitance unit comprising a first length of insulated electrical wire having a first conductor with a first thin impervious sheath of electrical insulation therearound, a first thin layer of fluid-applied electrically conductive material surrounding and adhering to said first insulation sheath, a second length of insulated electrical wire lying closely adjacent to said first electrical wire and having a second conductor in spaced substantially parallel relationship with said first conductor, said second conductor having a second thin impervious sheath of electrical insulation therearound, a second thin layer of fluid-applied electrically conductive material surrounding and adhering to said second sheath, said second layer of conductive material being in electrically conductive relationship with siad first layer at a plurality of points along its length, said first and second layers of conductive material defining a figure-eight configuration in cross section, said first conductor comprising a first terminal and a first electrode of said capacitance unit, said second conductor comprising a second terminal and a second electrode of said capacitance unit, said capacitance unit including the capacitance from said first conductor to said first layer in series electrical relationship with the capacitance from said second layer to said second conductor.

6. An electrical capacitance unit as claimed in claim 5 and wherein said insulation sheath of the first insulated wire touches the insulation sheath of the second insulated wire, said figure-eight configuration defined by said conductive layer having a narrow gap at the central region thereof where said insulation sheaths are touching.

7. An electrical capacitance unit comprising a first length of insulated electrical wire having a first conductor with a first thin sheath of electrical insulation therearound, a first thin layer of electrically conductive paint material adhering to said first insulation sheath, a second length of insulated electrical wire lying closely adjacent to said first electrical wire and having a second conductor in spaced relationship with said first conductor, said second conductor having a second thin sheath of electrical insulation therearound, a second thin layer of electrically conductive paint material adhering to said second sheath, said second layer of conductive paint material being in electrically conductive relationship with said first layer at a plurality of points along its length, as seen in cross section, said first and second layers of conductive paint material defining a figure-eight, said first conductor comprising a first terminal and a first electrode of said capacitance unit, said second conductor comprising a second terminal and a second electrode of said capacitance unit, said capacitance unit including the capacitance from said first conductor to said conductive paint material in series electrical relationship with the capacitance from said conductive paint material to said second conductor.

8. An electrical capacitance unit as claimed in claim 7 and wherein said first and second sheath of insulation is of a material selected from the class of wire-insulating materials consisting of enamel, varnish polytetrafluoroethylene, ceramic and glass.

9. An electrical capacitance unit as claimed in claim 7 and wherein the capacitance between said conductors is approximately one-half the capacitance from said first conductor to said conductive paint material.

10. An electrical capacitance unit comprising a first length of insulated electrical wire having a first conductor with a first thin sheath of electrical insulation therearound, a first thin layer of electrically conductive paint material adhering to said first insulation sheath, a second length of insulated electrical wire closely adjacent to said first electrical wire and twisted longitudinally into a spiral lay with said first wire, said second conductor having a second thin sheath of electrical insulation therearound, a second thin layer of electrically conductive paint material adhering to said second sheath, said second layer of conductive paint material being in electrically conductive relationship with said first layer at a plurality of points along its length, whereby said conductive paint material defines a figure-eight configuration as seen in cross section, said first conductor comprising a first terminal and a first electrode of said capacitance unit, said second conductor comprising a second terminal and a second electrode of said capacitance unit, said capacitance unit including the capacitance from said first conductor to said conductive paint material in series with the capacitance from said conductive paint material to said second conductor.

11. An electrical capacitance unit comprising first and second spaced conductive electrodes, first and second thin layers of dielectric material adhering to the respective adjacent surfaces of said electrodes, an integral conductive paint layer adhering to the opposite surfaces of both of said dielectric layers and forming a common electrode in electrical relationship between said first and second electrode.

12. A resistor and capacitor unit for use in electrical instruments and electronic systems and equipment comprising a resistor having a generally cylindrical form with terminals at opposite ends thereof, a cylindrical protective cover surrounding said resistor, and a capacitor within said cover adjacent to said resistor, said capacitor including a plurality of wires each having a thin sheath of electrical insulation therearound, said wires having portions in closely adjacent relationship, a first of said wires being connected to one of said terminals and a second of said wires being connected to the other of said terminals, a layer of electrically-conductive material on the insulation sheath of said first wire and a layer of electrically-conductive material on the sheath of said second wire, said layers of electrically-conductive material being interconnected and forming a floating electrode in capacitive relationship with said first and second wires.

13. A compact capacitor comprising a plurality of wires each having a thin sheath of electrical insulation therearound, said wires being in closely adjacent relationship, a first of said wires having a bare end forming a first terminal of the capacitor and a second of said wires having a bare end forming a second terminal of the capacitor, and a layer of electrically-conductive material adhering to the outer surface of the insulation sheaths of both said first and second wires.

References Cited in the file of this patent

UNITED STATES PATENTS

| | | |
|---|---|---|
| 1,558,043 | Priess | Oct. 20, 1925 |
| 1,610,980 | Silberman | Dec. 14, 1926 |
| 1,650,395 | Siegal | Nov. 22, 1927 |
| 1,721,503 | Priess | July 23, 1929 |
| 2,042,044 | Garstang | May 26, 1936 |
| 2,493,199 | Khouri | Jan. 3, 1950 |